J. HETTRICH.
MECHANICAL MOVEMENT.
APPLICATION FILED SEPT. 8, 1919.
1,348,880.
Patented Aug. 10, 1920.
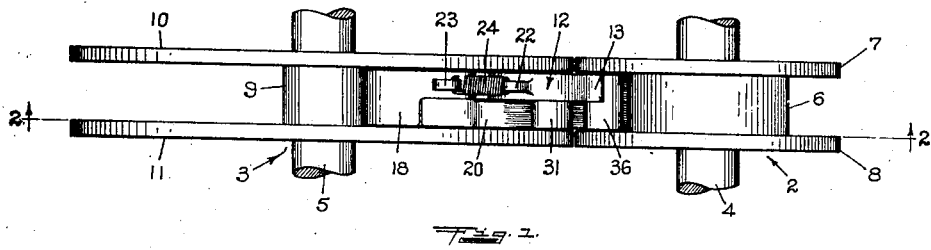
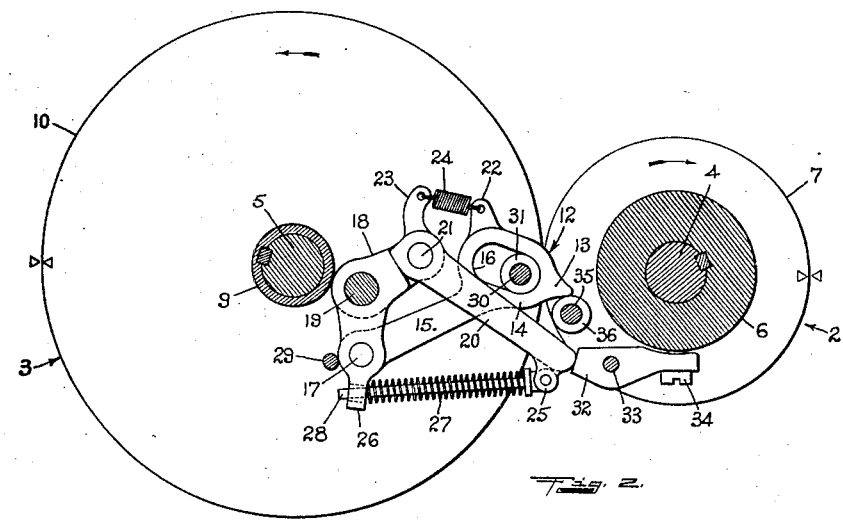
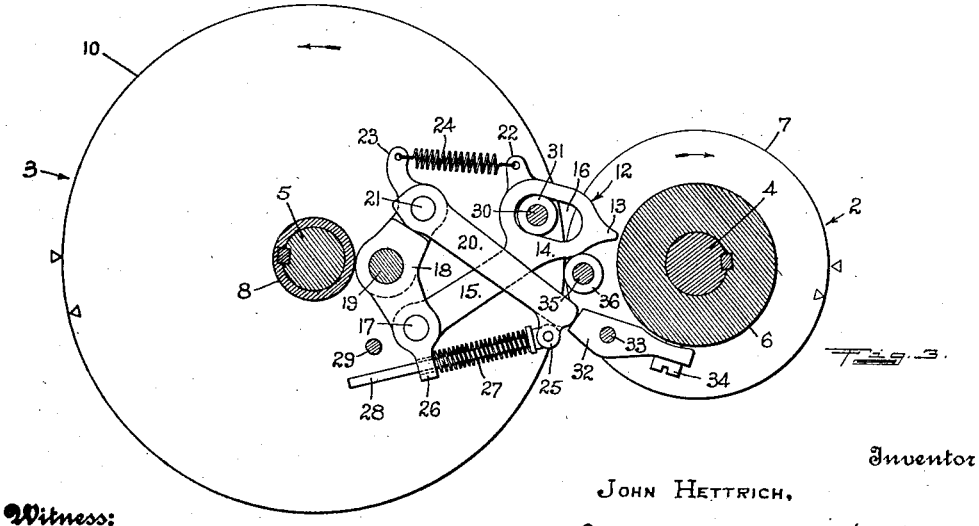
Inventor.
JOHN HETTRICH.
Witness:
A.W. Jamieson.
By Willard Eddy,
Attorney

UNITED STATES PATENT OFFICE.

JOHN HETTRICH, OF LINCOLN, NEBRASKA.

MECHANICAL MOVEMENT.

1,348,880. Specification of Letters Patent. Patented Aug. 10, 1920.

Application filed September 8, 1919. Serial No. 322,329.

*To all whom it may concern:*

Be it known that I, JOHN HETTRICH, a citizen of the United States, residing in the city of Lincoln, county of Lancaster, and State of Nebraska, have invented a certain new and useful Mechanical Movement, and have described the same in the following specification, illustrated by the accompanying drawings.

My invention relates to that class of mechanical movements which are used for transmitting motion, and which individually comprise a driving shaft, a countershaft, and intermediate transmitting mechanism. It is the main object of the invention to convert uniform rotary motion into a rotary motion which is gradually accelerated during a predetermined portion of a single rotation. To accomplish this object, I incorporate in my improved mechanical movement, as parts thereof, a reciprocable wedge carried by the driven shaft, and means actuated by the driving shaft for engaging and operating the wedge.

In said drawings, illustrating the best manner in which I have contemplated applying the principles of my invention, Figure 1 is an elevation of a mechanical movement which is constructed in accordance with these principles. Fig. 2 is a section on the section line 2—2 of Fig. 1; and Fig. 3 is a like section showing the parts of Fig. 2 as positioned at a different stage of operation.

In the illustrated specimen of my invention, the driving shaft and the countershaft are denoted by the numerals 4 and 5 respectively. Keyed on the shaft 4 is a spool, denoted generally by the numeral 2. This comprises the cylindrical spool body 6 and the two parallel end disks, or spool flanges, 7 and 8, which are of equal diameters. In like manner the shaft 5 has keyed thereon a spool which is denoted generally by the numeral 3. This comprises the spool body 9 and the disks, or flanges, 10 and 11, which are duplicates of each other, and lie in the same parallel planes as do the flanges 7 and 8 respectively.

The reciprocable wedge which is above mentioned as part of this mechanical movement, is denoted generally by the numeral 12. It comprises the wedge point 13, the wedge body 14, the wedge shank 15 and the guide slot 16. It is connected by the pivot-pin 17 with the vibrating lever 18, fulcrumed on the pivot-pin 19 of the flange 10, and is operatively vibrated by the push-bar 20, which is connected with the lever by the pivot-pin 21. The wedge is also provided with an ear 22, and the lever with an ear 23, which are tied yieldingly together by the coiled spring 24; while the push-bar 20 and this lever are similarly provided with the ears 25 and 26 respectively, which are held yieldingly apart by the coiled spring 27 on the connecting guide rod 28. The backward movement of the wedge is limited by the stop pin 29. Its forward movement is both limited and guided by the pin 30 and the antifriction sleeve 31 thereon, which are located near the periphery of the spool and work from end to end of the slot 16.

To engage the push-bar 20, the spool 6 carries the contact-block 32, which is adjustable on the pivot-pin 33 by means of the adjusting-screw 34; while, to engage the wedge, the same spool carries, near its periphery, the pin 35, which spans the space between the flanges 7 and 8, and is provided with the antifriction sleeve 36, rotatable thereon.

During the time in which the described apparatus, being operatively impelled by the uniform rotatory movement of the shaft 4, passes operatively from the position of parts which is shown in Fig. 2 to the position which is shown in Fig. 3, the wedge 14, being actuated by the contact block 32, through the push-bar 20, the lever 18 and the wedge shank 15, advances between the pins 30 and 35, and by forcing them apart, communicates to the spool 3 a peripheral speed which is progressively increased while being so communicated. In this way a uniform rotatory movement of the driving shaft is converted into a gradually accelerated partial rotation of the countershaft. To complete an entire rotation of this shaft by any similar or dissimilar means which may be employed for that purpose, is not included in the above stated object of the present invention.

I claim as my invention—

1. A mechanical movement comprising a spool keyed on a driving shaft, and carrying a driving-pin and a contact block, a spool keyed on a countershaft, a reciprocable wedge seated in the last-mentioned spool and adapted to engage the driving-pin, and a push-bar carried by the same spool in operative connection with the wedge, and adapted to engage the contact block.

2. A mechanical movement comprising an annular disk keyed on a driving-shaft, and carrying a driving-pin and a contact block, an annular disk keyed on a countershaft, a reciprocable wedge mounted on the last-mentioned disk and adapted to engage the driving-pin, and a push-bar mounted on the same disk in operative connection with the wedge, and adapted to engage the contact block.

Witness my signature at Lincoln, Nebraska, September 2nd, 1919.

JOHN HETTRICH.